Nov. 8, 1932.  P. CAPOCCI  1,887,397
LAMP SHADE
Filed Dec. 4, 1931  4 Sheets-Sheet 1
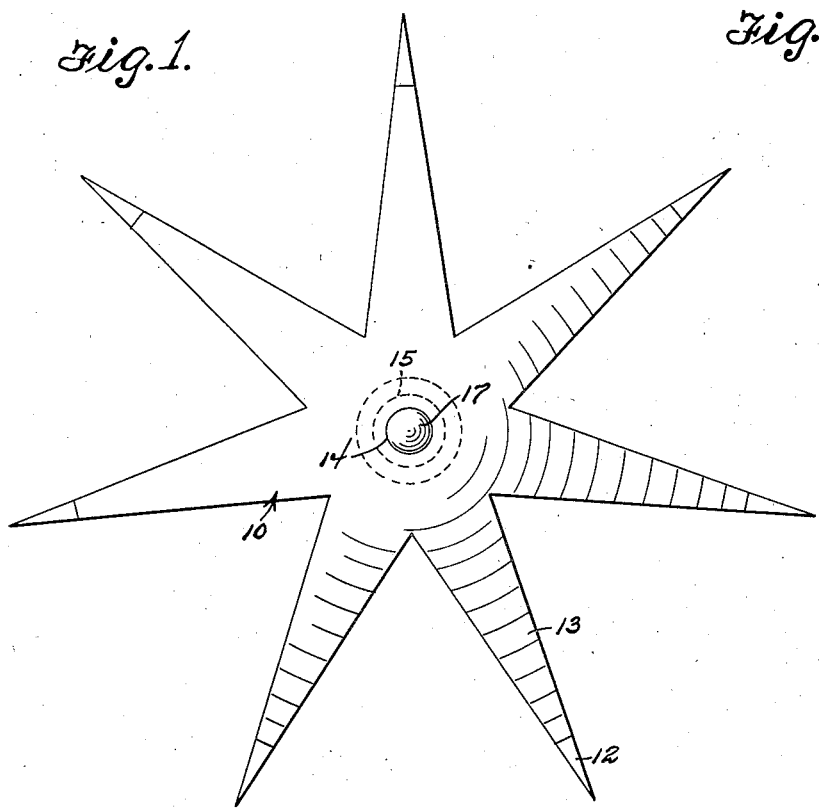
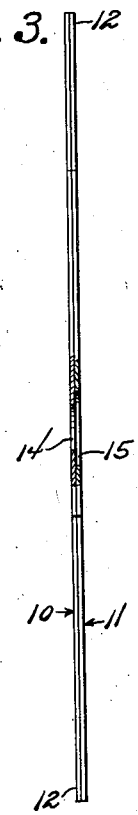
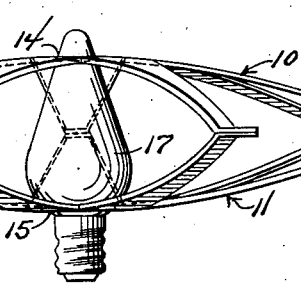
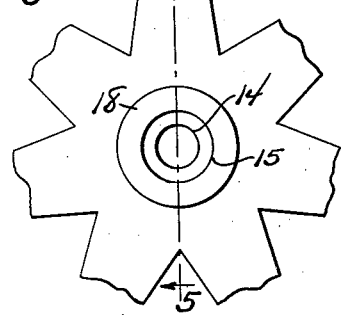
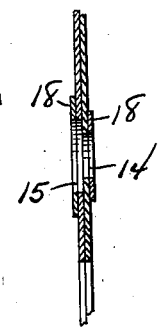
Pompeo Capocci
INVENTOR
BY Victor J. Evans & Co.
ATTORNEY Nov. 8, 1932.  P. CAPOCCI  1,887,397
LAMP SHADE
Filed Dec. 4, 1931  4 Sheets-Sheet 2
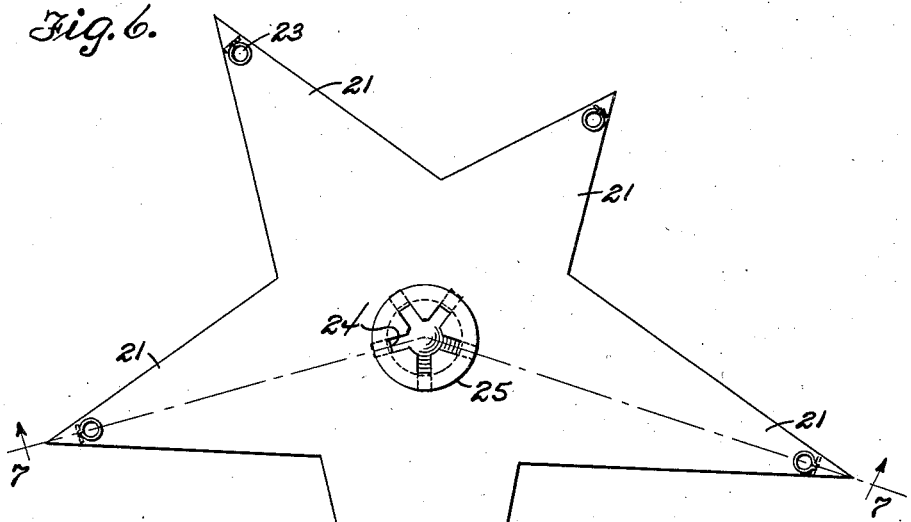
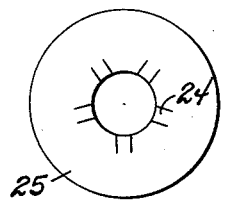
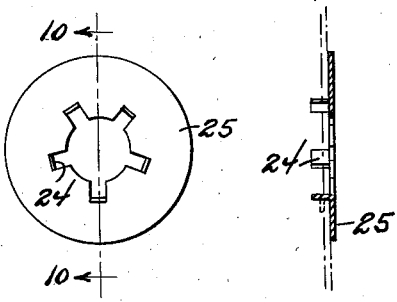
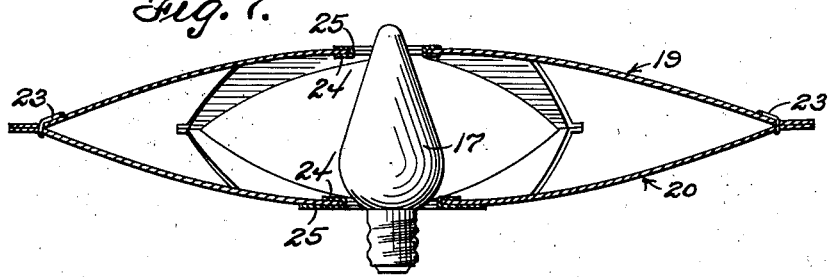
Pompeo Capocci
INVENTOR
BY Victor J. Evans & Co.
ATTORNEY Nov. 8, 1932.  P. CAPOCCI  1,887,397
LAMP SHADE
Filed Dec. 4, 1931  4 Sheets-Sheet 3

Pompeo Capocci
INVENTOR
BY Victor J. Evans & Co.
ATTORNEY

Nov. 8, 1932.  P. CAPOCCI  1,887,397
LAMP SHADE
Filed Dec. 4, 1931  4 Sheets-Sheet 4

Pompeo Capocci INVENTOR
BY Victor J. Evans & Co.
ATTORNEY

Patented Nov. 8, 1932

1,887,397

UNITED STATES PATENT OFFICE

POMPEO CAPOCCI, OF CRANSTON, RHODE ISLAND

LAMP SHADE

Application filed December 4, 1931. Serial No. 579,027.

The invention relates to lamp shades and more particularly to ornamental lamp shades of normally flat extensible kind.

The primary object of the invention is the provision of a lamp shade of this character wherein the construction thereof is an improvement in the subject matter of Letters Patent #1,787,357, dated December 30, 1930 and involves the assembly of the panels of its body so that on the application thereof to an electric light bulb the latter will sustain the body extended and this body will be imitative of a star, comet or other ornamental configuration.

Another object of the invention is the provision of a lamp shade of this character wherein the panels in the configuration thereof have the appearance of fret work and such body may be made from transparent or non-transparent material and by reason of its construction the light rays issuing therefrom will add materially to the ornamentation and also be attractive to the eye of a person and at the same time will assure of soft light.

A further object of the invention is the provision of a lamp shade of this character wherein the panels of its body are constructed and shaped so that in the joining thereof the body can be normally flat and on the application to an electric light bulb it will be extended to function as a shade for the light and as such will be ornamental and attractive.

A further object of the invention is the provision of a lamp shade of this character wherein the construction thereof is novel in form so as to render it serviceable for ornamental purposes and also for the shading of light from the electric light bulb, it being strong, yet light in weight and is readily collapsible to flat condition when not in use.

A still further object of the invention is the provision of a lamp shade of this character which is extremely simple in construction, neat and attractive in appearance, reliable and efficient in its purposes, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a plan view of a lamp shade constructed in accordance with the invention and the same being shown in flat condition.

Figure 2 is an edge elevation showing the shade extended and applied to an electric light bulb.

Figure 3 is a vertical sectional view through the shade when folded.

Figure 4 is a fragmentary plan view showing a slight modification with reinforcements at the point of mounting of the shade with the bulb.

Figure 5 is a sectional view on the line 5—5 of Figure 4 looking in the direction of the arrows.

Figure 6 is a view similar to Figure 1 showing another modification of shade.

Figure 7 is a sectional view on the line 7—7 of Figure 6 looking in the direction of the arrows.

Figure 8 is a plan view of one of the reinforcements prior to the mounting thereof upon the shade as shown in Figures 6 and 7.

Figure 9 is a view similar to Figure 8 showing the fastening prongs bent therefrom.

Figure 10 is a sectional view on the line 10—10 of Figure 9 looking in the direction of the arrows.

Figure 16 is a sectional view on the line 16—16 of Figure 15 looking in the direction of the arrows.

Similar reference characters indicate corresponding parts throughout the several views in the drawings.

Figure 11:
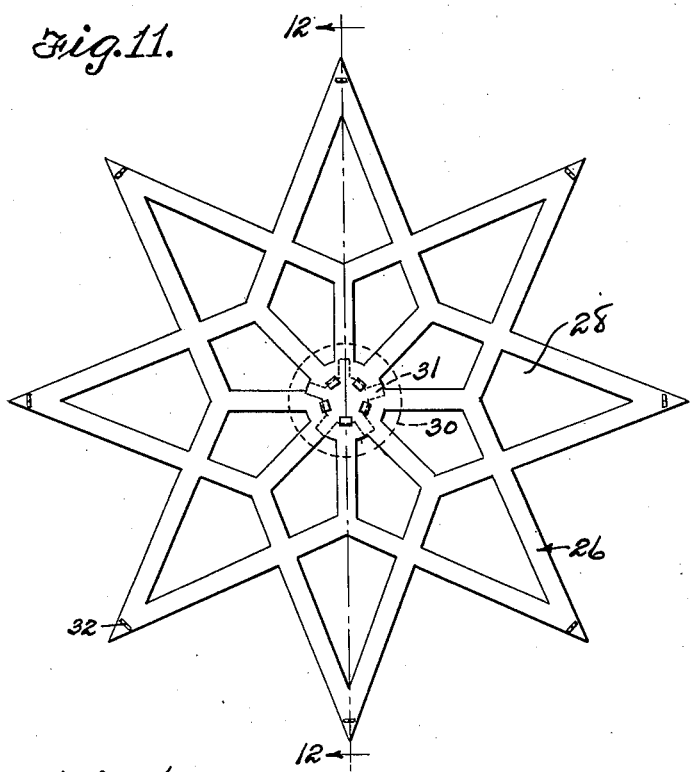
Figure 11 is a view similar to Figure 6 showing a further modification of lamp shade.

Referring to the drawings in detail, that is, Figures 1 to 4 thereof, the lamp shade which constitutes an improvement in Letters Patent #1,787,357 dated December 30, 1930, comprises a pair of opposed panels 10 and 11 respectively, these being similarly cut, stamped or otherwise formed to correspond to a seven pointed star which panels match each other and the tips 12 of the points 13 being united for a short distance in any suitable manner so that the panels 10 and 11 will be united with each other to constitute the body of the lamp shade.

The centers of the panels 10 and 11 are formed with suitable sized circular openings 14 and 15 respectively which may vary in their diameter with respect to each other and in their sizes will accommodate an electric light bulb 17 which may be of any conformation and in the mounting of such bulb 17 it expands or spreads the body of the lamp so that it will assume an extended position from the normally flat condition as shown in Figures 2 and 3 of the drawings, thus it being seen that the bulb serves as a support and spreader for the lamp shade in the use thereof.

The openings 14 and 15 are preferably reinforced through the medium of rings 18 preferably made from fireproof material such as asbestos or other similar material, these rings being made fast concentrically of the openings 14 and 15 respectively either internally or externally thereof and in this fashion will protect the body of the lamp shade from conflagration or from becoming fractured resultant from the introduction of the bulb 17 within the shade when required for use.

The shade in this make-up gives a very attractive ornamental effect. The bulb is introduced into the body between the points 13 of the panels 10 and 11 and after the latter have been slightly spread apart so that one end of the bulb, for example, the smaller end thereof, will become inserted in the smaller opening 14 while the socket end of the bulb can be engaged in the other opening 15 as is clearly evident from Figure 2 of the drawings.

Referring to Figures 6 to 10 respectively of the drawings there is shown a slight modification of the invention, wherein the panels 19 and 20 of the lamp shade are cut, stamped or otherwise formed to have the design of a comet and includes the four points 21 and a tail extension 22, the extremities of which are joined through the medium of staples 23 so that the said panels 19 and 20 will be united with each other and in the holes for accommodating the electric light bulb 17 are engaged the prongs 24 cut and bent from reinforcing disks 25, the prongs being clinched to the panels so that the disks 25 will circumscribe or be concentric of the hole and in this fashion the edges thereof reinforced.

Figure 12:
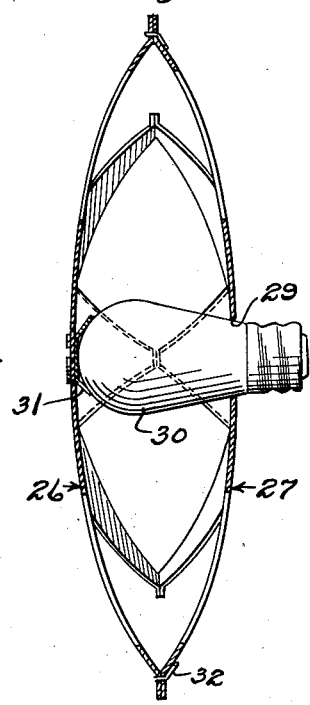
Figure 12 is a sectional view on the line 12—12 of Figure 11 looking in the direction of the arrows.

In Figures 11 and 12 there is shown a further modification of the invention wherein the panels 26 and 27 respectively are cut, stamped or otherwise formed similarly and of a configuration representative of an eight pointed star and each panel being fretted as at 28 while the panel 27 at its center has an opening 29 for the electric light bulb 30 and the panel 26 has fitted centrally thereto in confronting relation to the bulb 30 a spring fingered clip 31 to engage the outer end of the bulb which becomes seated in said clip and in this fashion the body of the lamp shade is supported thereby and held extended from normally flat condition. This construction of lamp shade is extremely artistic and ornamental in character, the ends or extremities of the points of the panels 26 and 27 being joined in matched relation through the medium of fasteners 32 so that such panels will be united with each other.

Figure 13:
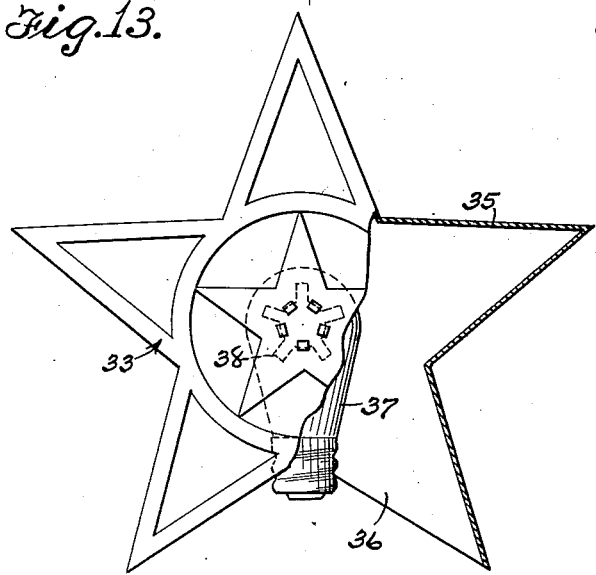
Figure 13 is a view similar to Figure 11 showing a further modification of shade, the body being partly broken away and the electric bulb arranged therein.
Figure 14:
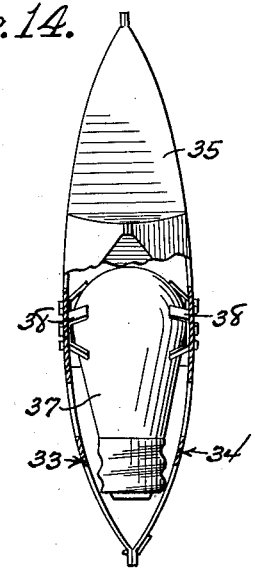
Figure 14 is an edge elevation partly broken away.

In Figures 13 and 14 there is shown a further modification wherein the panels 33 and 34 respectively being edge closed at 35 excepting that an opening 36 therein exists for the introduction of the bulb 37 between the panels 33 and 34 and the centers of these panels carry the resilient spring clips 38, these being alike and engage with opposite sides of the bulged end of the bulb 37 so that in this manner the lamp shade is hung or fastened thereto when the shade has been extended or spread for use.

Figure 17:
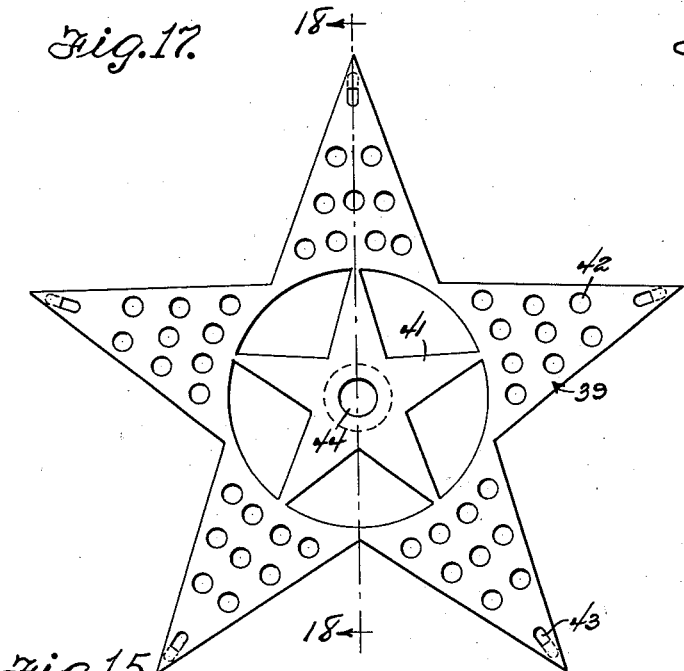
Figure 17 is a plan view similar to Figure 11 showing a still further modification of shade.
Figure 18:
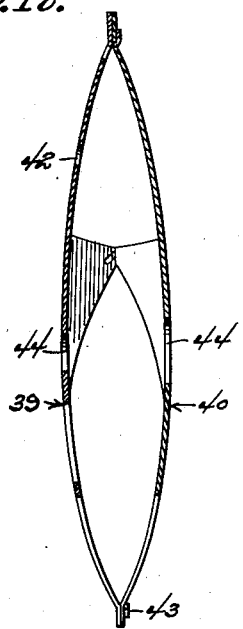
Figure 18 is a sectional view on the line 18—18 of Figure 17 looking in the direction of the arrows.
Figure 15:
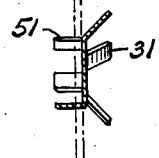
Figure 15 is a detail view of a bulb engaging clip used with the shade shown in Figures 11, 12, 13 and 14.
Figure 19:
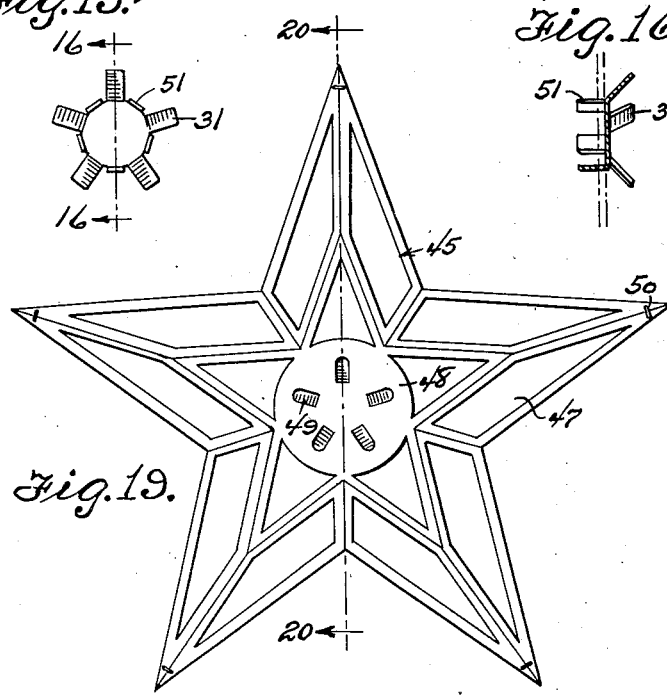
Figure 19 is a plan view similar to Figure 17 showing a still further modification of shade.
Figure 20:
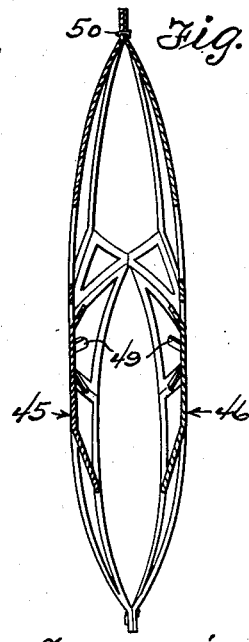
Figure 20 is a sectional view on the line 20—20 of Figure 19 looking in the direction of the arrows.

In Figures 17 and 18 there is shown a further modification of the invention, wherein the panels 39 and 40 respectively are shaped correspondingly to a five pointed star and the centers of these panels being cut, stamped or otherwise formed to effect the center star 41, while the points concentrically of the centers of the panels are provided with perforations 42, the ends or extremities of the points being united through the medium of panels 43 so that the panels will be joined for effecting the unitary lamp shade, it being understood of course that there are provided openings 44 in said panels for the seating or mounting of the electric light bulb therein on expanding or extending the body of the lamp shade.

In Figures 11 to 20 of the drawings there is shown a still further modification of the invention, wherein the panels 45 and 46 respectively are fretted as at 47 and the centers of the panels in this instance are of a circular conformation as at 48 yet they may be otherwise formed and these centers 48 carry the spring fingered clips 49 for engagement with the bulged end of an electric light bulb for the mounting of the lamp shade thereon as will be clearly apparent. In this instance the bulb is introduced edgewise between the panels 45 and 46 of the lamp shade and in this fashion causes a spreading of said panels for the seating of the bulb in the sockets 49 and thus retaining the shade extended and mounted upon the said bulb, the ends of the points of the panels 45 and 46 being joined through fasteners 50. It will be obvious that this construction of lamp shade gives a fret appearance thereto and the light from the bulb will issue forth therefrom so that the shade will be extremely ornamental and artistic in appearance in the use of the same.

The clips 49 are preferably formed with bendable prongs or tongues 51 to be clinched when engaged in the centers 48 of the panels 45 and 46 and in this fashion the clips may be secure and firm thereon.

What is claimed is:—

1. A lamp shade of the kind described comprising a pair of panels matched and shaped similarly to each other and of ornamental configuration, and fasteners uniting the panels marginally thereof, the panels being normally flat and extended upon the introduction of an electric light bulb therebetween, the said panels having openings for accommodating the lamp bulb for the support of the shade thereby.

2. A lamp shade of the kind described comprising a pair of panels matched and shaped similarly to each other and of ornamental configuration, fasteners uniting the panels marginally thereof, the panels being normally flat and extended upon the introduction of an electric light bulb therebetween, the said panels having openings for accommodating the lamp bulb for the support of the shade thereby, and reinforcements about the openings.

3. A lamp shade of the kind described comprising a body formed with normally flat superposed panels, means uniting the marginal portions of the panels together, said panels being adapted for extension upon the introduction of an electric light bulb therebetween, and means at the centers of the panels for engaging the said bulb for the mounting of the body thereon.

4. A lamp shade of the kind described comprising a body formed with normally flat superposed panels, means uniting the marginal portions of the panels together, said panels being adapted for extension upon the introduction of an electric light bulb therebetween, means at the centers of the panels for engaging the said bulb for the mounting of the body thereon, and means for reinforcing the centers of said panels.

5. A lamp shade of the kind described comprising a body formed with normally flat superposed panels, means uniting the marginal portions of the panels together, said panels being adapted for extension upon the introduction of an electric light bulb therebetween, means at the centers of the panels for engaging the said bulb for the mounting of the body thereon, and means for reinforcing the centers of said panels, the said panels being fretted.

6. A lamp shade of the class described comprising a pair of flat panels having marginal ornamental configuration, means uniting the panels and means engageable with an electric light bulb when inserted between the panels for the mounting of said shade and its support thereon.

In testimony whereof I affix my signature.

POMPEO CAPOCCI.